Feb. 26, 1935.  F. D. FUNSTON  1,992,525

SHOCK ABSORBER

Filed Jan. 25, 1933

INVENTOR
FREDERICK D. FUNSTON
BY
Spencer, Hardman & Sehn
ATTORNEYS

Patented Feb. 26, 1935

1,992,525

UNITED STATES PATENT OFFICE 1,992,525

SHOCK ABSORBER

Frederick D. Funston, Dayton, Ohio, assignor, by mesne assignments, to General Motors Corporation, Detroit, Mich., a corporation of Delaware Application January 25, 1933, Serial No. 653,431

15 Claims. (Cl. 267—8)

This invention relates to improvements in hydraulic shock absorbers.

It is among the objects of the present invention to provide an hydraulic shock absorber capable of automatically adjusting itself properly to control relative movements of the vehicle body and axles in accordance with the nature of the roadway over which the vehicle is being operated.

Another object of the present invention is to provide a shock absorber with automatic adjusting mechanism adapted to respond only in response to movements of the vehicle body for purposes of controlling the resistance of the shock absorber offered to the movements of such vehicle body.

Further objects and advantages of the present invention will be apparent from the following description, reference being had to the accompanying drawing wherein a preferred embodiment of one form of the present invention is clearly shown.

Figure 1:
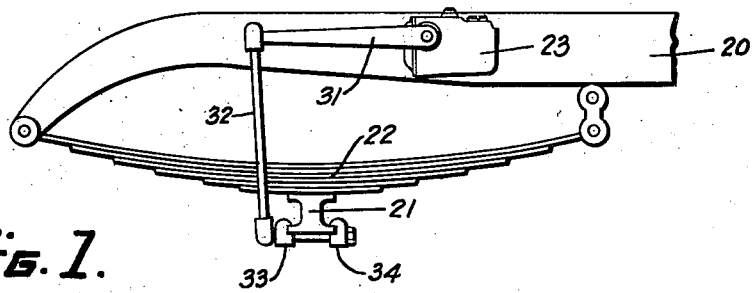
Fig. 1 is a fragmentary side view of a vehicle chassis showing a shock absorber embodying the present invention applied thereto. The road wheels of the vehicle have been omitted for the sake of clearness.

When the vehicle is being operated over a comparatively smooth highway or boulevard, it has been found that the vehicle springs will, if properly designed, provide adequate cushioning or shock absorbing means and thus it is desirable to reduce the resistance offered by the shock absorbers of the vehicle to a minimum under these circumstances. However, as the vehicle is operated over a comparatively rough roadbed full of obstructions and ruts, more extensive movements of the axle and car body will obtain which movements cause inconvenient jars and shocks to be transmitted to the vehicle body that cannot properly be cushioned or absorbed by the vehicle springs. Under these circumstances the same shock absorber, which offers little or no resistance on the smooth highway or boulevard, should offer a maximum amount of resistance to body and axle movements whereby a comfortable ride will be provided.

In the present invention applicant has provided a shock absorber adapted automatically to adjust itself in accordance with the nature of the roadbed over which the vehicle is being operated. An inertia mass controlled mechanism is provided which, while the vehicle is being operated over a comparatively smooth highway or boulevard and the body movements are substantially constant, will maintain the shock absorber fluid flow control device in such a position of adjustment in which very little resistance is offered to the flow of fluid within the shock absorber and consequently very little resistance is offered to relative movements between the vehicle body and axle. However, in response to accelerations in the velocity of the body movements, particularly upwardly, that is the rebound movements of the vehicle body, this inertia controlled mass will become effective to adjust the fluid flow control device increasingly to restrict the fluid flow and thereby increase the resistance offered by the shock absorber.

Referring to the drawing, the frame of the vehicle is designated by the numeral 20. This frame is supported upon the vehicle axle 21 by springs 22, the ends of which are hingedly attached to the frame 20 in any well known manner.

The shock absorber comprises a casing 23 providing a fluid reservoir 24 and a cylinder 25. The open end of the shock absorber is sealed by a cover 26 attached to the shock absorber casing by screws 27, this cover being provided with a gasket to prevent fluid leaks.

Figure 2:
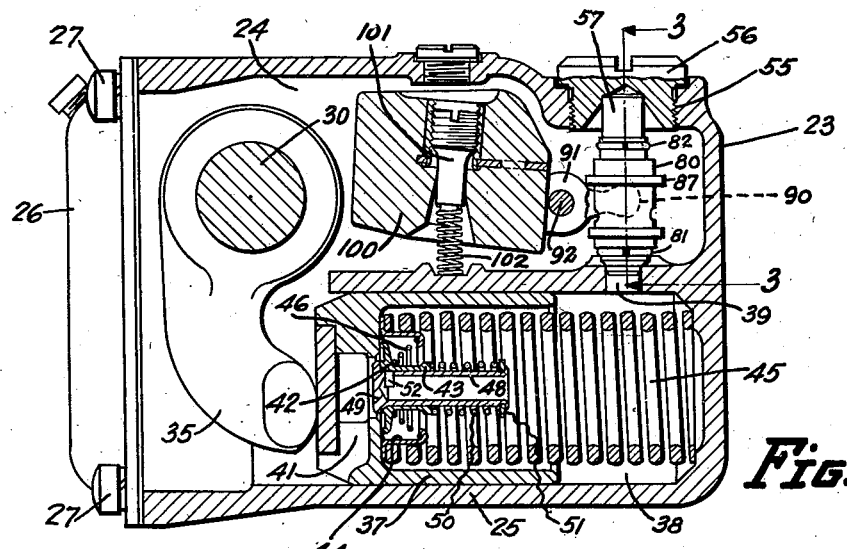
Fig. 2 is a longitudinal sectional view taken through the shock absorber, certain parts being shown in elevation for the sake of clearness.

A rocker shaft 30 is journalled in the casing, one end of the shaft extending outside the casing and having the shock absorber operating arm 31 provided thereon. The free end of this arm is swivelly secured to one end of a link 32, the opposite end of said link being swivelly secured to a member 33 which is clamped to the axle 21 by a clamping member 34. Within the shock absorber casing, shaft 30 has a rocker arm 35 secured thereto so that said arm will rotate with the shaft. As shown in Fig. 2, the free end of rocker arm 35 is adjacent the open end of the cylinder 25 so as to be engageable by the head of the piston 37 reciprocably carried within the cylinder. This piston forms a compression chamber 38 within the cylinder which compression chamber is in communication with the reservoir 24 through a port 39 provided in the cylindrical wall of the cylinder 25 within the casing 23. In the head of the piston 37 there is provided a duct or passage 41 through which fluid may be passed from one side of the piston to the other, or more particularly between the compression chamber and the reservoir.

A fluid flow control mechanism is provided for piston passage 41, this mechanism including an intake valve 42 having a tubular body portion 43. A cage 44 surrounding valve 42 is maintained upon the inner surface of the head of piston 37 by a spring 45 which abuts the closed end of cylinder 25, this spring tending to maintain the piston 37 in engagement with the free end of the rock arm 35 under all circumstances. Another spring 46 is interposed between the cage 44 and the intake valve 42, yieldably urging said intake valve against the surface of the piston head surrounding the port or passage 41. A pressure release valve having a tubular body portion 48 and a head portion 49 is slidably supported within the tubular body portion 43 of the intake valve, the head portion 49 of the pressure release valve being yieldably maintained in position upon the intake valve 42 by a spring 50, one end of which engages an abutment collar 51 attached upon the tubular body portion 48 of the pressure release valve, the other end of said spring engaging the end of the tubular body portion 43 of the intake valve. An opening 52 is provided in the side of the tubular body portion 48 of the pressure release valve, this opening 52 normally lying within the confines of the intake valve 42 so that normally no fluid can flow through it.

Another fluid flow control device is provided for the port 39, which may be termed an outlet port for the compression chamber 38. In the casing 23 and coaxially aligned with port 39 there is an opening 55, interiorly threaded to receive a screw plug 56 which has a recess in its interior surface aligning with the port 39. Into this recess is press-fitted one end of a tubular member 57, the other end of said tubular member fitting snugly into the port 39, an annular ridge 58 engaging the wall about the port 39 and acting as a stop so that when screwing the screw plug 56 into opening 55 of the casing, tubular member 57 is rigidly clamped between the cylindrical wall of cylinder 25 and the screw plug 56.

Figures 3, 4:
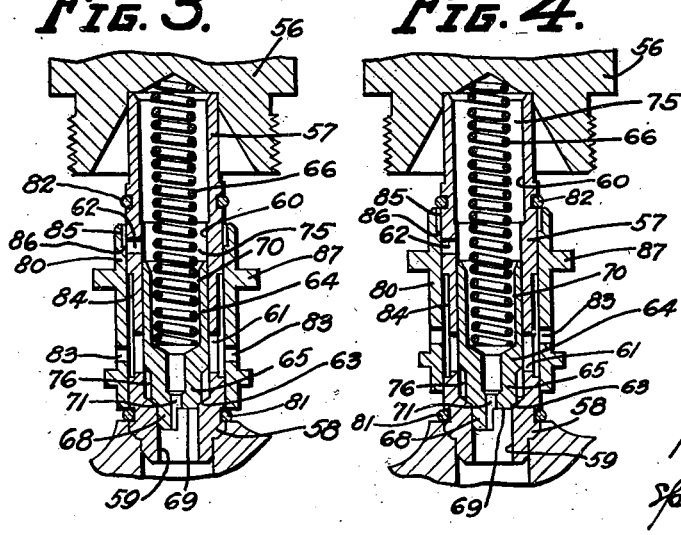
Fig. 3 is an enlarged detail sectional view of the fluid flow control device of the shock absorber taken substantially along the line 3—3 of Fig. 2.
Fig. 4 is a view similar to Fig. 3 showing the fluid flow control device in another position.

As will be seen in Figs. 3 and 4, the tubular member 57 is of two different interior diameters, the portion of the tubular member extending into port 39 and designated by the numeral 59 being of lesser diameter than the tubular portion designated by the numeral 60 which is more adjacent the screw plug 56. Openings 61 are provided in the cylindrical wall of the tubular member 57 adjacent the end of said tubular member which fits into the port 39. Another opening 62 is provided in the cylindrical wall of the tubular member 57 more adjacent the end engaging the screw plug 56. The two diameter portions 59 and 60 of the tubular member 57 provide a shoulder 63 which forms a valve-seat for the piston valve 64 slidably carried within the larger diameter portion 60 of the tubular member 57. A reduced diameter portion 65 in said piston valve 64 is urged into engagement with the valve-seat 63 by a spring 66 interposed between the valve and the screw plug 56. Another portion 68 of the valve 64 extends into the smaller diameter portion 59 of the tubular member 57, one side of said valve portion 68 being cut away as at 69 to provide an unbalanced effect whereby fluid is forced to one side as it moves past the valve, thereby urging the valve to one side and preventing chattering thereof.

As will be seen in Figs. 3 and 4, the piston valve is recessed as at 70, the spring 66 extending into this recess. A restricted passage 71 provides communication with the end of the valve extending into the port 39 and the recess 70 in said valve so that it may be said of this valve that at all times there is communication between port 39 and the chamber 75, which chamber is formed between the piston valve 64 and screw plug 56 within the tubular member 57. As can be seen in Figs. 3 and 4, openings 62 lead from chamber 75 into the reservoir 24. The reduced portion 65 of valve 64 provides an annular chamber 76 between the valve and the inner annular wall of the tubular member 57, which annular chamber 76 is always in communication with the openings 61 in said tubular member 57.

A sleeve-valve 80 slidably fits about the tubular member 57, this sleeve-valve normally resting against an abutment ring 81 provided on the tubular member 57 adjacent the cylindrical wall of cylinder 25. Another abutment ring 82 provided on the tubular member 57 forms a stop member limiting the upward movement of the sleeve-valve on the tubular member 57. Openings 83 are provided in the annular wall of the sleeve-valve, which openings communicate with an annular chamber 84 formed between the tubular member 57 and the sleeve-valve 80, by an annular groove provided in the outer wall of the tubular member 57. This annular chamber 84 is in communication with the openings 61 in said tubular member. At the end of the sleeve-valve 80, more adjacent the screw plug 56, an inner annular groove 85 is provided, this groove being of such a depth that its lower edge, designated by the numeral 86, comes within the confines of opening 62 in the tubular member 57, thus said opening 62 is normally in communication with the inner annular groove 85 in the sleeve-valve 80 and consequently a path for fluid flow is established from chamber 75 through opening 62, thence through the inner, annular groove 85 to the reservoir 24. A flange 87 is provided on the outer peripheral surface of the sleeve-valve 80, said flange acting as an abutment for the forked end 90, shown in dotted lines in Fig. 2, of a bracket 91 which is pivotally carried by a pin 92 supported transversely of the casing and to which bracket the inertia control mass or weight 100 is anchored. This inertia control weight has an adjusting screw 101 therein forming an abutment for the spring 102 which rests upon the cylindrical wall of the cylinder 25 within the casing 23. This spring 102 yieldably supports the weight 100 in a properly balanced position, in which position the sleeve valve 80 maintains opening 62 in tubular member 57 as shown in Fig. 3.

The shock absorber operates in the following manner:

When the vehicle wheels carried by axle 21 strike an obstruction or raise in the roadway, axle 21 will be thrust upwardly toward frame 20, compressing spring 22 and, through the link connection 32 with the shock absorber operating arm 31, rotates the shock absorber shaft 30 clockwise. This results in a clockwise rotation of rocker arm 35, consequently piston 37 is urged by the spring 45 to follow the rocker arm 35. As the piston 37 moves out of the cylinder, fluid in the reservoir 24, acting through piston passage 41, will move the intake valve 42 from its seat to establish a substantially free flow of fluid from the reservoir 24 into the compression chamber 38. The spring 22 will now return to its normal load position, resulting in a reversal of the operation of the shock absorber. The piston will now be pushed by the counter-clockwise rotating lever 35 so as to exert a pressure upon the fluid within the compression chamber 38. The first flow of fluid established in response to this piston movement will obtain through port 39 through the constantly restricting orifice 71 of valve 64 into the chamber 75, thence through opening 62 in the tubular member 57 through the annular groove 85 in the sleeve-valve 80 into the reservoir 24. If the fluid pressure within the chamber 38 is sufficient, it will move valve 64 against the effect of spring 66 to leave the valve-seat 63 and thus to establish a flow of fluid past the valve into the annular chamber 76, thence through aligned openings 61 and 83, in the tubular member 57 and sleeve valve 80 respectively, into the reservoir. Inasmuch as chamber 85 is opened at 62, fluid may flow from said chamber and substantially no fluid pressure will be exerted upon the piston valve 64 to urge it toward its seat and thus the pressure upon the end surface of the valve, adjacent its seat, will predominate to maintain said valve open to relieve the fluid pressure within the chamber 38.

If, in response to a more extensive movement of the axle or more extensive movements of the car body at a constant velocity, a high pressure is established within the compression chamber 38, which pressure cannot properly be relieved by the fluid flow past valve 64, the fluid pressure acting upon the pressure release valve 49 will move it against spring 50, relatively to the intake valve 42, and thus the side opening 52 in said pressure release valve will be moved beyond the confines of the intake valve to establish a flow of fluid through the pressure release valve, its side opening 52, piston passage 41 into the reservoir 24. These pressure relieving flows by both valves 64 and 49 respectively will obtain in response to predetermined fluid pressures as long as the inertia control mass 100 is not rendered effective by accelerations in the velocity of car body movements upwardly. When such accelerations occur, however, then the weight 100 tending to stand still due to its inertia, casing 23 being moved upwardly at accelerated rate due to its being attached to the frame 20, will result in an upward thrust of the forked arm 90 of weight bracket 91 thereby moving the sleeve valve 80 upwardly along the tubular member 57 so that the opening 62 in said tubular member is completely shut off, coming within the confines of the sleeve valve 80. Now the fluid flow through the restricted passage 71 of valve 64 will be discontinued, however, a resultant fluid pressure will be built up within the chamber 75 substantially equal to the fluid pressure at the end of the valve 64 adjacent the port 39. The area of the valve portion forming chamber 75 being substantially equal to the area exposed to the fluid pressure from port 39, while said valve 64 is open, will bring said valve into substantial balance in which spring 66 becomes effective to move the valve to port closing position, or more specifically into the normal position as shown in Fig. 4. In this case the area of the valve which is equal to the area of the opening 59 of sleeve 57, and which has the fluid pressure from the port exerted thereupon, is comparatively less than the area exposed to fluid pressure within the chamber 75, and consequently as long as opening 62 is held closed by sleeve valve 86, piston valve 64 will be maintained upon its seat completely to shut off any fluid flow that might be established thereby. Under these circumstances high pressure release valve 49 is the only one that can relieve the fluid pressure within the chamber 38 and consequently the shock absorber will offer a maximum resistance to body movements in response to accelerations in velocity of said body movements. As soon as pressure within the chamber 32 is eliminated, pressure within the chamber 75 will likewise cease, then the sleeve valve 80 may be returned to normal position by the weight member 100. The opening 62 directing fluid pressure against one side only of the slide valve 86, will tend to create a sticking effect which will maintain the sleeve valve in closing position as long as pressure is maintained within the chamber 75, regardless of the reduction in accelerations of car body movements upwardly.

From the aforegoing it may be seen that applicant controls fluid pressures by his inertia mass control for purposes of adjusting the fluid flow control device whereby, at predetermined accelerations in the velocity of car body movements upwardly, fluid flow established by one of the control devices will be entirely cut off to provide a maximum resistance to car body movements.

While the form of embodiment of the present invention as herein disclosed, constitutes a preferred form, it is to be understood that other forms might be adopted, all coming within the scope of the claims which follow.

What is claimed is as follows:

1. In an hydraulic shock absorber, the combination with a casing providing a fluid reservoir and a fluid displacement chamber having an outlet port leading into the reservoir; of a fluid flow control device for said port comprising a fixed tubular member closed at one end, the other, open end fitting into the port, said member providing a valve-seat and having openings in its wall, a piston-valve in said tubular member, yieldably urged upon its seat, said valve having an orifice providing constant communication between opposite sides of the valve; a sleeve-valve slidably fitting about the tubular member and movable to close the openings in said tubular member which lead into the interior of said member on the side of the piston-valve opposite the port; and an inertia weight held in balanced position by a spring, and operatively connected to the sleeve-valve for moving it into a position to close certain openings in the tubular member in response to accelerations in the velocity of movement of the casing in one direction.

2. A hydraulic shock absorber having a fluid displacement chamber provided with an outlet port; means adapted to control the fluid flow from said port, said means including a member adapted to permit a constantly restricted fluid flow from the port and, at a predetermined fluid pressure in said chamber, a less restricted fluid flow from the port; means adapted to render the said member effective to shut off the less restricted flow of fluid from the port by discontinuing the constantly restricted flow provided by said member; and an inertia weight for actuating the last mentioned means.

3. A hydraulic shock absorber having a fluid displacement chamber provided with an outlet port; fluid flow control means for said port, said means comprising a member adapted to permit divided flows of fluid from said port, one a constantly restricted flow, the other a less restricted flow; means adapted to render the member effective to shut off the less restricted fluid flow by discontinuing the constantly restricted flow; and an inertia weight for actuating the last mentioned means.

4. A hydraulic shock absorber having a fluid displacement chamber provided with an outlet port; means for controlling the flow of fluid from said port, said means comprising a spring-loaded member, orificed to permit a constantly restricted flow from the port and adapted to be actuated by fluid pressure to permit another, variably restricted flow from the port; means adapted to control the constantly restricted flow to render the said member effective to control the variably restricted flow; and an inertia weight for actuating said last mentioned means.

5. A hydraulic shock absorber having a fluid displacement chamber provided with an outlet port; means for controlling the flow of fluid from said port, said means comprising a spring loaded member, normally adapted to permit a constantly restricted fluid flow from said port, and movable by a predetermined fluid pressure in said chamber to permit another, less restricted fluid flow from the port; a valve adapted to discontinue the constantly restricted flow provided by said member, thereby rendering the member effective to shut off the less restricted flow; and an inertia weight for actuating said valve in response to accelerations in the movements of the shock absorber in a vertical direction.

6. A hydraulic shock absorber having a fluid displacement chamber provided with an outlet port; means for controlling the flow of fluid from said port, said means comprising a member adapted to permit two flows of fluid from the port, one a constantly restricted flow, the other a variably, less restricted flow; means for discontinuing one of said flows to render the member effective to stop the other flow; and an inertia weight for actuating said last means.

7. A hydraulic shock absorber having a fluid displacement chamber provided with an outlet port; fluid flow controlling means for said port, said means comprising a spring loaded member adapted, without bodily movement, to permit a constantly restricted flow of fluid from said port and when actuated by a predetermined fluid pressure in said chamber, to permit another, less restricted fluid flow from the port; means adapted to discontinue the constantly restricted flow for rendering the spring loaded member effective to stop the less restricted flow; and an inertia weight connected to said last means, and adapted to actuate it in response to accelerations in the movements of the shock absorber vertically.

8. In a hydraulic shock absorber, the combination with a casing providing a cylinder in which a piston forms a displacement chamber; an outlet port for said chamber; of a fluid flow control device for said port, adapted, in response to the movement of the piston in one direction and up to a predetermined degree of fluid pressure within the displacement chamber, constantly to restrict the flow of fluid from said port and adapted to provide a second, less restricted flow from said port when the pressure within said chamber exceeds said predetermined degree, said fluid flow control device including also a valve adapted to discontinue the constantly restricted fluid flow to render the device effective to shut off the less restricted flow from the port; and an inertia weight, connected to said valve, and yieldingly suspended, for actuating said valve in response to accelerations in the movements of the shock absorber vertically.

9. In a hydraulic shock absorber, the combination with a casing providing a cylinder in which a piston forms a displacement chamber; an outlet port for said chamber; of a fluid flow control device for said port, adapted, in response to the movement of the piston in one direction to provide for successive flows of fluid from the port, the first, a constantly restricted flow within a predetermined range of fluid pressure in said displacement chamber, the second, a variable and less restricted flow of fluid at comparatively higher fluid pressures within said chamber, said fluid flow control device including also a valve adapted to stop the constantly restricted flow and render the device effective to discontinue the less restricted flow of fluid; and an inertia weight for actuating said valve.

10. In a hydraulic shock absorber, the combination with a casing providing a cylinder in which a piston forms a fluid displacement chamber; an outlet port for said chamber; of a fluid flow control device for said port, said device having a member adapted to permit fluid to flow through it and around it, the flow through it being constantly restricted, the flow around it occurring only in response to bodily movement of said member out of normal position, said fluid flow control device including also a valve adapted to discontinue the flow of fluid through said member and thereby render the device effective to stop the flow around said member; and an inertia weight for actuating said valve.

11. In a hydraulic shock absorber, the combination with a casing providing a cylinder in which a piston forms a fluid displacement chamber; an outlet port for said chamber; a fluid flow control device for said port, said device having a spring loaded member, orificed to provide for a constantly restricted fluid flow from the port, said member being movable by fluid pressure to permit another, less restricted flow of fluid from the port, said fluid flow control device including also a valve adapted to be actuated to discontinue the constantly restricted flow provided by the spring loaded member for rendering said member effective to shut off the less restricted flow; and an inertia weight for actuating said valve.

12. In a hydraulic shock absorber, the combination with a casing providing a cylinder in which a piston forms a fluid displacement chamber; an outlet port for said chamber; a fluid flow control device for said port, said device comprising a tubular extension for the port, said extension having side openings and providing a valve-seat, and a piston-valve slidable within said tubular extension, and having an orifice, said piston-valve being yieldably urged upon said valve-seat whereby, at certain pressures within the displacement chamber a constantly restricted flow of fluid is permitted through the orifice in said piston-valve and at comparatively higher pressures within said chamber, said piston-valve will be moved from its seat to permit another, less restricted fluid flow from the port, said fluid flow control device including also a sleeve-valve adapted to close certain openings in the tubular extension to discontinue the constantly restricted flow through the piston-valve whereby fluid pressures on each side of said valve are substantially equalized and the valve will be actuated to shut off the less restricted flow; and an inertia weight connected to the sleeve-valve for actuating it in response to accelerations in the movements of the shock absorber vertically.

13. In a hydraulic shock absorber, the combination with a casing providing a cylinder in which a piston forms a fluid displacement chamber; an outlet port for said chamber; a tubular extension for said port, said extension being closed at its one end and having side openings; a spring loaded, orificed piston-valve slidably carried in said tubular extension, normally permitting fluid flow from the port, through the orifice and out of a certain side opening in the tubular extension, said piston-valve being adapted to be actuated by a predetermined fluid pressure in the displacement chamber to permit a flow of fluid from the port through other side openings in the tubular extension; means adapted to be actuated to close the said opening through which the fluid flow from the orifice in the piston-valve is being ejected, thereby substantially balancing fluid pressure on each side of said piston-valve and permitting it to be actuated to shut off the fluid flow through the other side opening in the tubular extension; and an inertia weight for actuating said means in response to accelerations in the movement of the shock absorber vertically.

14. In a hydraulic shock absorber, the combination with a casing providing a cylinder in which a piston forms a fluid displacement chamber; an outlet port for said chamber, a tubular extension for said port, closed at one end, and having openings spaced longitudinally of the tubular extension; a piston-valve slidable in said tubular extension, normally shutting off one of the openings in said extension from the port, said piston-valve having an orifice providing a constantly restricted flow of fluid from the port to the other opening in the tubular extension; a sleeve-valve adapted to be actuated to close said other opening for substantially balancing pressures on each side of the piston valve, whereby the spring is effective to move said piston-valve into normal position; and an inertia valve for actuating said sleeve-valve.

15. In a hydraulic shock absorber, the combination with a casing providing a cylinder in which a piston forms a fluid displacement chamber; an outlet port for said chamber; means for controlling fluid flow from said port said means comprising a spring loaded member adapted, without movement, to provide for a constantly restricted fluid flow from the port, and movable by a predetermined fluid pressure within said chamber, to permit another, less restricted fluid flow from the port; means for discontinuing the constantly restricted flow to render the spring loaded member effective to shut off the other flow; and an inertia weight for actuating said last means in response to accelerations in the vertical movement of the shock absorber.

FREDERICK D. FUNSTON.